Sept. 28, 1948.   R. A. CHRISTIAN   2,450,121
ACCOUNTING MACHINE

Filed Feb. 22, 1945   3 Sheets-Sheet 1

INPUT

Inventors
RAYMOND A. CHRISTIAN,
JESSE R. GANGER and
WILLIAM L. PADEN
BY Earl Beust
Their Attorney Sept. 28, 1948.   R. A. CHRISTIAN   2,450,121
ACCOUNTING MACHINE Filed Feb. 22, 1945   3 Sheets-Sheet 2

Inventors
RAYMOND A. CHRISTIAN,
JESSE R. GANGER and
WILLIAM L. PADEN
BY
Their Attorney Patented Sept. 28, 1948

2,450,121

UNITED STATES PATENT OFFICE 2,450,121

ACCOUNTING MACHINE

Raymond A. Christian, Jesse R. Ganger, and William L. Paden, Dayton, Ohio, assignors to The National Cash Register Company, Dayton, Ohio, a corporation of Maryland Application February 22, 1945, Serial No. 579,270

5 Claims. (Cl. 235—3)

The present invention relates to accounting machines and is particularly directed to the control mechanisms of such machines.

More specifically, the present invention is directed to mechanism for selecting and conditioning the balance totalizer for automatic sub-balance and/or balance operations.

The mechanism which forms the basis for this invention is under control of the traveling carriage in predetermined columnar positions, and, when said carriage arrives at said predetermined columnar positions while moving in a tabulating direction, a selectively operable switch mechanism is actuated by flexible tappets located on said carriage in relation to said predetermined columnar positions. The switch mechanism in turn controls the operation of two solenoids, one of which causes the balance totalizer to be selected and conditioned for an automatic sub-balance operation and the other of which causes the balance totalizer to be selected and conditioned for an automatic balance operation.

Obviously the above novel mechanism may be used for selecting and conditioning the balance totalizer or any other totalizer, for that matter, for any other type of operation, including adding, non-adding, and subtracting operations.

Broadly, it is an object of the present invention to provide means for automatically selecting and conditioning a totalizer for certain operations.

A more specific object is the provision of means controlled by the traveling carriage in predetermined columnar positions thereof for selecting and conditioning a totalizer for certain types of operations.

Another object is the provision of means operated by electromagnetic means, in turn energized under influence of the traveling carriage in predetermined columnar positions thereof, for selecting and conditioning a totalizer for certain operations.

Still another object is to supply means rendered effective upon tabulating movement of the traveling carriage, and controlled by said carriage in predetermined columnar positions thereof, for selecting and conditioning a totalizer for certain operations.

A further object is to provide a machine, having a traveling carriage, with means rendered effective by the traveling carriage tabulating mechanism and operated by said carriage in predetermined columnar positions thereof for selecting and conditioning a totalizer for certain operations.

A further object is to provide electrically operated means for selecting and conditioning a totalizer for certain operations, said electrically operated means rendered effective by the traveling carriage tabulating mechanism and controlled by the traveling carriage in predetermined columnar positions thereof.

With these and incidental objects in view, the invention includes certain novel features of construction and combinations of parts, the essential elements of which are set forth in appended claims and a preferred form or embodiment of which is hereinafter described with reference to the drawings which accompany and form a part of this specification.

GENERAL DESCRIPTION

The accounting machine chosen to illustrate the present invention is driven or operated by a conventional type of electric motor, said motor being of the start and stop type, which operates only during machine operations, or when the traveling carriage is being moved in a return direction. The electric motor is controlled and machine operation is initiated by means of three release or motor bars, including a Main release bar, a Vertical Feed release bar, and a Skip-Tabulating release bar, and, in addition, said motor is controlled, and machine operation is initiated, by various so-called motorized control keys.

The machine embodying the present invention is provided with a front-feed type of traveling carriage, which is shiftable in a tabulating direction under influence of a spring-actuated drum or reel mechanism and is shiftable in return direction by the machine operating motor, or said carriage may also be shifted in a return direction manually, if desired. The traveling carriage carries a platen roll for presenting record material to the printing elements, said platen roll being movable from printing position to front feeding position and vice versa, to facilitate the insertion of the record material around the platen roll. Ordinarily the traveling carriage is automatically tabulated near the end of machine operation, after the printing mechanism has functioned, from one columnar position to the next. A manually operable key is provided for tabulating the traveling carriage from one columnar position to the next whenever desirable. Likewise the traveling carriage may be skip-tabulated through intervening columnar positions to predetermined columnar positions by the use of the skip-tabulating starting bar to initiate machine operation.

When the traveling carriage reaches the end of its tabulating movement, mechanism controlled thereby renders the carriage return mechanism operative to return said traveling carriage to its extreme right-hand or starting position. Likewise the machine is provided with the usual manipulative return bars for returning the traveling carriage from tabulated positions through intervening columnar positions, to predetermined columnar positions.

Machines of the type embodying the present invention are usually provided with six totalizers, one or more of which may be an add-subtract totalizer, often referred to as a balance totalizer or a crossfooter. It is not desirable to limit the machine to any particular number or type of totalizers, as the number and type of totalizers may be increased or decreased to meet the particular needs of the business system to which the machine is being applied. As presently arranged, the machine has one add-subtract or balance totalizer and five adding totalizers.

The machine embodying the present invention is provided with a plurality of denominational rows of amount keys, which control the positioning of corresponding differential actuators in adding and subtracting operations, said actuators in turn controlling the positioning of corresponding type carriers and corresponding totalizer wheels selected for engagement therewith. Any or all of the six totalizers may be selected for engagement with the amount actuators in adding operations by means of the traveling carriage in predetermined columnar positions thereof. Likewise the balance totalizer may be selected for engagement with the amount actuators in subtracting operations by means of the traveling carriage in predetermined columnar positions thereof.

The machine embodying the present invention is provided with a plurality of control keys including a Balance key and a Sub-Balance key for selecting and conditioning the balance totalizer for balance and sub-balance, or resetting and reading, operations. The Balance key is a so-called motorized key, in that depression thereof initiates machine operation, and, as said Balance key is always used in conjunction with the Sub-Balance key—that is, depression of the Sub-Balance key carries the Balance key downwardly in unison therewith—it is evident that use of either of these keys initiates machine operation. The control keys also include Total keys for the other five totalizers, depression of any one of which causes the corresponding totalizer to be totalized or reset, and said control keys likewise include a Sub-Total key, which is used in conjunction with the Total keys to sub-totalize or read the corresponding totalizers. The control keys also include a Subtract key for selecting the Balance totalizer for subtract operations, an Add key for selecting the Balance totalizer for add operations, a Non-Add key, which non-adds all the totalizers so that the amount keys may be used as printing keys only, and a Release key for releasing any depressed amount key and any depressed control key which is not motorized.

The balance totalizer of the present machine is provided with overdraft mechanism, similar to that disclosed in United States Patent No. 2,243,806, issued May 27, 1941, to Laurence N. Lehman, for transposing the complementary figure of an overdraft to a positive figure. The operator is informed of the existence of an overdraft in the balance totalizer by the locking of the Balance key and the Sub-Balance key, which is effected automatically when the balance totalizer changes from a positive condition to a negative condition.

The overdraft mechanism includes a Sub-Credit Balance key and a Credit Balance key, both of which are motorized, for initiating sub-credit operations and/or credit balance operations, respectively, in which the complementary amount of an overdraft contained in the balance totalizer is transposed to a positive amount or a true negative balance, and is recorded upon the record material. In a sub-credit balance operation, the complementary amount of the overdraft is returned to the balance totalizer. Such operation is often referred to as a "reading of the overdraft." In a credit balance operation, the balance totalizer is left in a zeroized condition, this type of operation being often referred to as a "resetting of the overdraft."

The present machine is provided with a full complement of typewriter keys for typing data, of a descriptive nature or otherwise, upon the record material. However, the typewriter mechanism is a matter of choice and may be omitted if desirable.

The typewriter keys and the typewriter space bar actuates a typewriter escapement mechanism which letter-spaces the traveling carriage in a tabulating direction. During tabulating movement of the traveling carriage under influence of any of the manual or automatic tabulating means to be described presently, the typewriter escapement mechanism is temporarily rendered inoperative. However, said escapement mechanism again becomes effective upon arrival of the traveling carriage in any columnar position.

The machine embodying the present invention is provided with mechanism for depressing the Sub-Balance key and/or the Balance key when the traveling carriage arrives in columnar positions corresponding, respectively, to these keys, while traveling in a tabulating direction.

The Balance key and the Sub-Balance key are depressed by their respective electromagnets or solenoids, one of which is connected to the Sub-Balance key and the other of which is connected to the Balance key. The energization of the electromagnets is controlled by a switch mechanism, which is operated by tappets located in predetermined columnar positions on the traveling carriage, in cooperation with variable connection between said tappets and the switch mechanism. The tappets for actuating the switch mechanism are by-pass tappets and are effective only when the traveling carriage is moving in a tabulating direction.

Mechanism under control of the traveling carriage tabulating mechanism renders the variable connection ineffective to operate the switch mechanism at all times except when the traveling carriage is moving in a tabulating direction under influence of either the automatic column-to-column tabulating mechanism, the manually operable Tabulating key, or the Skip-Tabulating starting bar. The variable connection is retained ineffective while the traveling carriage is being letter-spaced in a tabulating direction under influence of the typewriter keys or the typewriter space bar.

Manually operated switch mechanisms are provided for disconnecting the source of electrical energy to the solenoids to render them inoperative when desirable.

The switch operating tappets are of different lengths, the sub-balance tappet being the longer of the two, and consequently, when the traveling carriage is tabulated to the sub-balance column, said tappet depresses the switch mechanism full distance to energize both of the solenoids to cause both the Sub-Balance key and the Balance key to be depressed, which, it will be recalled, is necessary in order to select and condition the balance totalizer for a sub-balance operation. When the traveling carriage is tabulated to the balance column, the balance tappet, which is shorter than the sub-balance tappet, depresses the switch mechanism partial distance to energize only the solenoid for the Balance key, whereupon said solenoid depresses said Balance key to cause the balance totalizer to be selected and conditioned for a balance operation.

The solenoid-actuated key-depressing mechanism, which is controlled by the traveling carriage, is shown here as applied to the Balance key and the Sub-Balance key. However, it is not the desire to limit this mechanism to any particular control keys, for it could obviously be used in connection with any or all of the control keys, if desired.

In the ensuing pages, mechanism pertinent to the present invention will be fully described, and, if a detailed description of the mechanism not pertinent to the present invention is desired, reference may be had to United States Patents No. 2,082,098, issued June 1, 1937, to Raymond A. Christian, No. 2,189,851, issued February 13, 1940, to Paul H. Williams, et al., and No. 2,313,982, issued March 16, 1943, to Paul H. Williams, and to the Lehman Patent No. 2,243,806, referred to hereinbefore.

DETAILED DESCRIPTION

The mechanism of the machine is supported by a main right frame 29 (Figs. 4 and 9) and a main left frame 30, secured to a machine base 31 and maintained in spaced relationship to each other by various cross frames, bars, and rods. The mechanism of the machine is enclosed in a suitable case or cabinet 32 (Fig. 3), which is likewise secured to the machine base 31.

The machine is operated by a conventional type of electric motor of the start-stop type, in that it functions only during machine operation. Operation of the machine is initiated by a main release bar 33 (Fig. 1), which closes the motor switch and engages the clutch mechanism, which connects the motor to the machine mechanism. In addition to the Main release bar 33 (Fig. 1), machine operation may be initiated by a Skip Tabulating release bar 34 or a Vertical Feed release bar 35, each of said bars cooperating with extensions from the Main release bar 33, which underlie the corresponding bars and through which said bars, when depressed, simultaneously depress said Main release bar 33 to initiate operation of the machine. The downward portion of the bar 33 (Fig. 1) has alined slots which, in cooperation with corresponding studs 36 and 37 secured in the right frame 29, shiftably mount said release bar 33.

Figure 1:
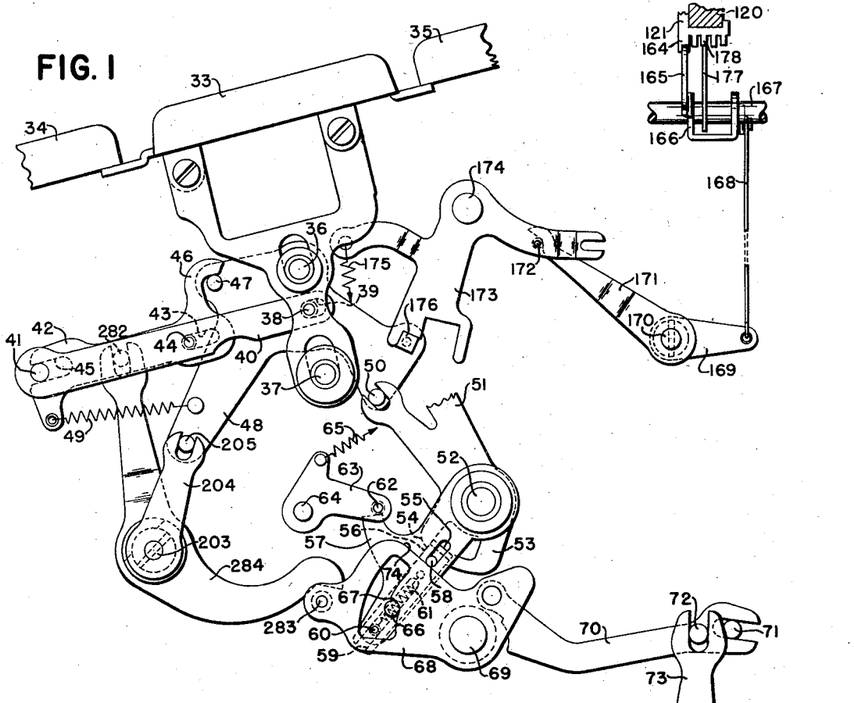
Fig. 1 is a right side elevation of the machine releasing or starting mechanism and includes certain controlling mechanisms pertinent to the present invention.

The downward portion of the bar 33 carries a stud 38, which engages a slot 39 in the rear end of a bar 40, the forward end of which is pivoted on a stud 41 in the right frame 29. A latch 42 is shiftably mounted on the bar 40 by means of a slot 43 in its rearward end, which engages a stud 44 in said bar, and by means of a slot 45 in the front end of said latch 42, which engages the stationary stud 41. The latch 42 has an upward hook-shaped extension 46, which cooperates with a stud 47 in a lever 48 free on the stud 36. A spring 49, tensioned between the latch 42 and the lever 48, urges said latch rearwardly to normally maintain the hook-shaped extension 46 thereof in engagement with the stud 47, as shown in Fig. 1. A rearward extension of the lever 48 carries a stud 50, engaged by a slot in an upward extension of an arm 51 free on a stud 52 secured in the right frame 29.

A slotted downward extension of the arm 51 forms fingers 53 and 54, which cooperate with a bent-over portion 55 of a slide 56 shiftably mounted on an arm 57 free on the stud 52, by means of a stud 58 carried by said slide, in cooperation with a slot in said arm and by means of a slot 59 in the lower end of said slide, in cooperation with a stud 60 in said arm 57. A spring 61, tensioned between the stud 60 and a stud in the slide 56, urges said slide downwardly to normally maintain the bent-over portion 55 in engagement with the fingers 53 and 54, as shown here (Fig. 1), to form a disconnectable operating connection between the arms 51 and 57. An upward extension of the arm 57 (Fig. 1) is engaged by a stud 62 in a bell crank 63 free on a stud 64 in the frame 29. A spring 65 (Fig. 1) urges the bell crank 63 clockwise, which, through the stud 62, urges the arm 57 counterclockwise to normally maintain a stud 66, carried by said arm, in yielding engagement with a shoulder 67 formed in an opening in an arm 68 free on a stud 69 secured in the frame 29. The arm 68 has pivotally connected thereto the forward end of a pitman 70, the rearward end of which is bifurcated to embrace a stationary stud 71, said pitman carrying a stud 72, which engages a slot in an upward extension of a clutch control lever 73. The action of the spring 65 is transmitted, through the bell crank 63, by the slide 56 and the fingers 53 and 54, to the arm 51, then through the lever 48, the latch 42, and the bar 40 to the release bar 33, to yieldingly urge and normally maintain said bar in its upward or undepressed position, as shown here.

Depression of the release bar 33 (Fig. 1), through the stud 38, rocks the bar 40 and the latch 42 clockwise, causing the extension 46, in cooperation with the stud 47, to rock the lever 48 counter-clockwise. Counter-clockwise movement of the lever 48, through the stud 50, rocks the arm 51 clockwise, said arm in turn, through the fingers 53 and 54, in cooperation with the bent-over portion 55 of the slide 56, rocking said slide and the arm 57 also clockwise to disengage the stud 66 from the shoulder 67. This frees the arm 68, the pitman 70, and the lever 73 to the action of a spring (not shown) connected to said lever 73, which immediately rocks said parts counter-clockwise to engage the clutch mechanism and simultaneously close the switch for the operating motor, to initiate operation of the machine.

Near the end of machine operation, the lever 73 (Fig. 1) is restored clockwise in the usual manner, which, through the pitman 70, also restores the arm 68 clockwise until the shoulder 67 moves beyond the stud 66, whereupon said stud engages said shoulder to retain said parts in restored position, thereby terminating operation of the machine.

In case the release bar 33 (Fig. 1) is inadvertently or otherwise retained depressed at the end of machine operations, repeat operations of the machine are prevented in the following manner. When the release bar 33 is retained depressed at the end of machine operation, restoring clockwise movement of the arm 68, as explained above, causes a surface 74 thereon to engage the stud 58 to shift the slide 56 inwardly against the action of the spring 61, to move the bent-over portion 55 out of engagement with the finger 53 and into a clearance opening formed by the finger 53 to permit the arm 57 to be restored counter-clockwise by the bell crank 63 independently of the arm 51, so that the stud 66 may engage the shoulder 67 to prevent repeat operations of the machine.

When pressure is removed from the release bar 33, the spring 49 restores the lever 48 clockwise, which, through the stud 50, also restores the arm 51 counter-clockwise to permit the bent-over portion 55 to again move out of the clearance opening into engagement with the fingers 53 and 54 to again operatively connect said arms 51 and 57. It is to be understood that restoring clockwise movement of the lever 73 and the arm 68 moves the shoulder 67 a substantial distance beyond the stud 66 to provide sufficient overthrow to disengage the bent-over portion 55 from the fingers 53 and 54 in the manner explained above, after which said lever 73 and said arm 68 are returned counter-clockwise until said shoulder 67 engages said stud 66.

The action of the latch 42 in preventing maloperation of the machine, in connection with automatic sub-balance and balance operations, will be explained later herein.

*Keyboard and differential mechanism*

*Traveling carriage and typewriter mechanism*

The present machine is provided with a plurality of denominational rows of amount keys (not shown), each row of which has cooperating therewith a corresponding differential actuator 76 (Fig. 9) operatively connected to a corresponding printer positioning segment 77 free on a shaft 78 supported by the main frames 29 and 30. The segment 77 is connected by a link 79 to a corresponding type sector 80. In adding and subtracting operations, the actuator 76 is positioned by the corresponding depressed amount key and, through the segment 77 and the link 79, positions the corresponding type sector 80 accordingly, so that, upon operation of the impression mechanism, the value of the depressed amount key will be recorded upon record material supported by a platen roll 81 supported in the framework of a traveling carriage 82 mounted for horizontal shifting movement upon ways 83 and 84 (Fig. 3) secured to the machine case 32. The platen 81 is of the front-feed or throat-opening type, in that said platen may be moved from a printing position to a front-feeding position and vice versa, to facilitate the insertion and removal of record material into and from the front-feed throat thereof.

The segment 77 (Fig. 9) is yieldingly connected by a spring 85 to a transverse bar 86 of a leading frame having an invariable back-and-forth movement, the initial rearward movement positioning the actuator 76 and the printing sector 80 in accordance with the value of the depressed amount key, and the return forward movement of said leading frame, near the end of machine operation, restoring said actuator and type sector to zero or home position. The actuator 76 has, on its rear end, rack teeth 87 (Fig. 9), which cooperate with corresponding wheels of the various totalizers for positioning said wheels in accordance with the values represented by the depressed amount key.

The machine embodying the present invention is provided at its rear end with six totalizers arranged in vertical pairs. However, as only the balance totalizer, or crossfooter, is essential to a proper disclosure of the present invention, it is believed sufficient to illustrate and describe only the corresponding wheel 88 (Fig. 9) for the balance totalizer in connection with the actuator 76.

In adding operations, after the actuator 76 (Fig. 9) has been positioned under influence of the depressed amount key, the corresponding wheel 88 of the balance totalizer is engaged with the rack teeth 87 of said actuator, and return forward movement thereof revolves said wheel in an additive direction to enter therein a value corresponding to said depressed amount key. In subtracting operations, the corresponding wheel 88 of the balance totalizer is engaged with the rack teeth 87 prior to initial rearward movement of the actuator 76, which movement revolves said wheel in a subtractive direction to subtract therefrom an amount corresponding to the depressed amount key.

Figure 9:
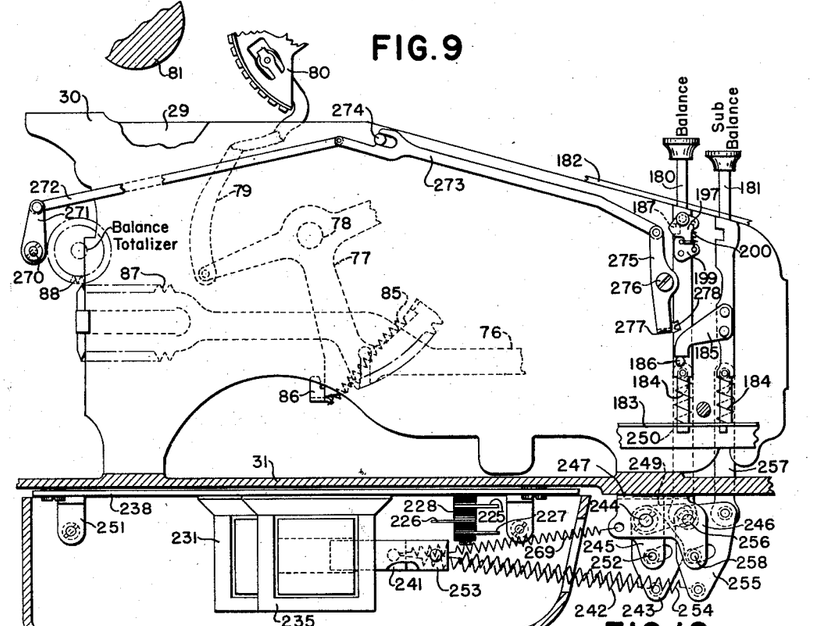
Fig. 9 is a left side elevation of the machine, showing the electromagnetic means for operating the balance key and the sub-balance key.

In balance and sub-balance operations, the wheel 88 of the balance totalizer is engaged with the rack teeth 87 prior to initial rearward movement of the actuator 76, which movement revolves said wheel in a subtractive direction to zero position, to position said actuator and the type sector 80 in accordance with the value standing on said totalizer wheel 88. In balance operations, the wheel 88 is disengaged from the teeth 87 prior to return forward movement of the actuator 76, and, as a result, said wheel remains in a zeroized condition. In sub-balance operations, the wheel 88 remains in engagement with the teeth 87 during return forward movement of the actuator 76, and, as a result, said wheel is restored to its original position. This constitutes the only difference between a balance operation and a sub-balance operation.

Carriage escapement mechanism

The traveling carriage 82 (Fig. 3) is urged toward the left, or in a tabulating direction, by a spring-actuated drum (not shown), which is connected to said carriage by a draw band 90 in cooperation with a stud secured in the carriage framework. The traveling carriage is normally restrained against movement in a tabulating direction, under influence of the draw band 90, by the usual traveling carriage escapement mechanism comprising a rack 91 (Fig. 3) secured to the traveling carriage framework 82 and extending the full length of said carriage. The rack 91 meshes with a pinion 92 secured on the upper end of a vertical shaft 93 (Figs. 3 and 6) journaled in a bushing 94 secured in an escapement cross frame 95, which extends between and is secured to the main frames 29 and 30. Secured on the lower end of the vertical shaft 93 is an escapement ratchet wheel 96 having escapement teeth which cooperate with an escapement pawl mechanism comprising an escapement release pawl 97 and an escapement retaining dog (not shown), both of which are mounted on an escapement arm 98 journaled on a screw stud 99 threaded in the escapement frame 95 (Figs. 6 and 8).

The present machine is provided with a full complement of typewriter keys, which, through their corresponding levers 100 (Fig. 3), actuate corresponding type bars 101 to type data, of a descriptive nature or otherwise, upon the record material supported by the platen roll 81. The levers 100 actuate the usual universal bar 102, which, through connections not shown here but well known in the art and fully disclosed in the patents referred to near the beginning of this specification, actuates the escapement arm 98 (Figs. 6 and 8) to letter-space the traveling carriage 82 in the regular and usual manner.

In addition to the actuation of the escapement mechanism by the typewriter keys, mechanism is provided for disengaging the escapement release pawl 97 to release the traveling carriage 82 for movement in a tabulating direction to its various columnar positions, as will be explained in detail later.

Traveling carriage return mechanism

Motor-operated means is provided for returning the traveling carriage from tabulated positions to extreme right-hand or starting position, or for returning said traveling carriage to predetermined columnar position.

A carriage return rack 103 (Fig. 3) is shiftably mounted on brackets secured to the traveling carriage framework 82, and the teeth of said rack mesh with gear teeth in a clutch driven member 104 free on a vertical shaft 105 journaled in a bracket 106 secured to the machine case 32. The clutch driven member 104 has, on its upper edge, clutch teeth arranged to be engaged with corresponding clutch teeth on the lower face of a clutch driving member 107 secured on the shaft 105, which shaft is operatively connected to the machine operating motor and is continuously rotated thereby while said motor is operating. An annular groove in the hub portion of the driven member 104 is engaged by one end of a shifting lever 108 (Fig. 3) pivoted on a screw stud in the bracket 106, the other end of said lever being linked by a closely coiled spring 109 to one end of a lever 110 pivoted on a screw stud in the machine case 32. The other end of the lever 110 freely engages a slot in the rear end of a lever 112 pivoted on a screw stud 113 in the case 32. The forward end of the lever 112 (Fig. 3) is pivotally connected to the downward end of a plunger 114 supported for vertical shifting movement in a boring in the case 32. A camming surface on the upper end of the plunger 114 cooperates with a corresponding camming surface on an enlarged portion of a slide 115 mounted in a slot in the case 32. The slide 115 has an upward projection 116, which is engaged by an operating finger mounted on the traveling carriage 82, when said carriage reaches the terminus of its movement in a tabulating direction, and this engagement shifts said slide 115 toward the left.

Figure 3:
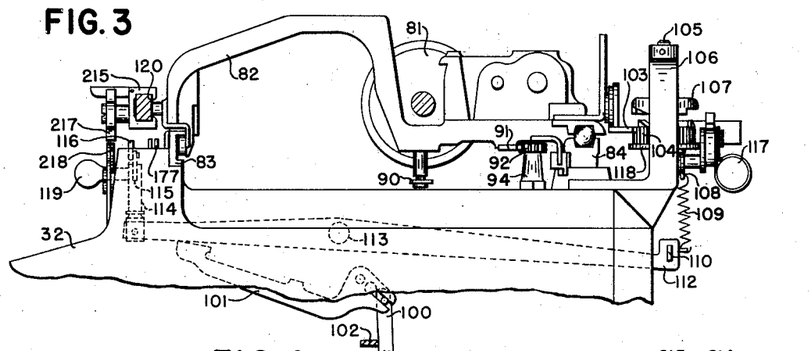
Fig. 3 is a right side elevation of the traveling carriage.
Figures 4, 5, 6, 7, 8:
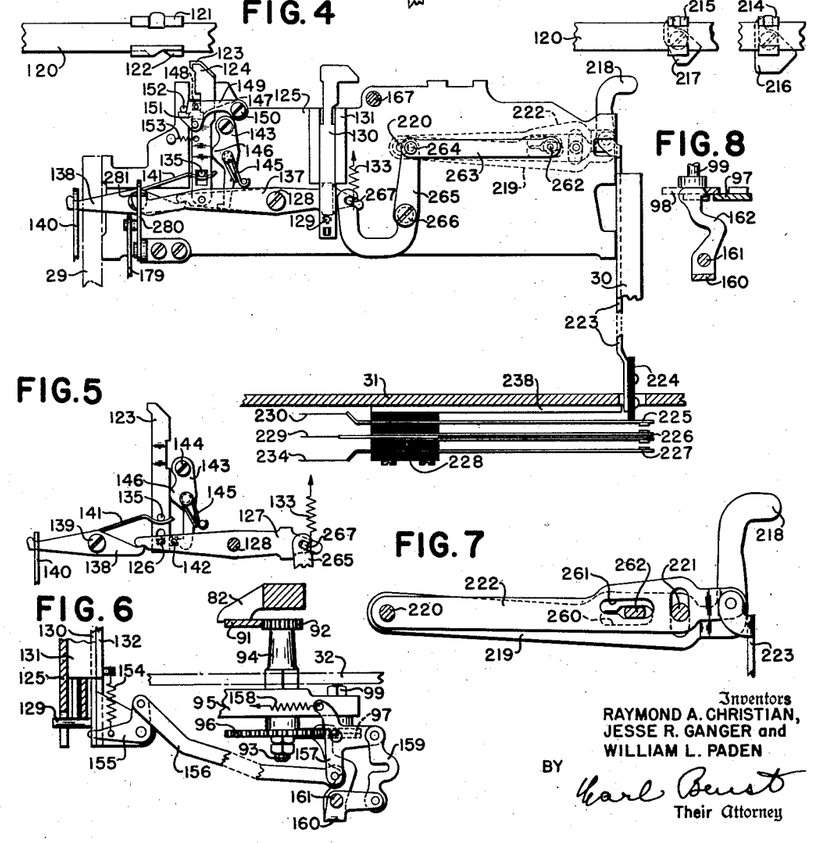
Fig. 4 is a view as observed from the back of the machine, showing a portion of the carriage tabulating mechanism and the switch mechanism controlled thereby.
Fig. 5 is a detail view of a portion of the carriage tabulating mechanism.
Fig. 6 is a detail view of a portion of the typewriter escapement mechanism and certain controlling mechanism therefor.
Fig. 7 is a detail view of a portion of the switch controlling and operating mechanism.
Fig. 8 is a detail view of a part of the mechanism shown in Fig. 6, for controlling the typewriter escapement mechanism.

Movement of the slide 115 toward the left causes the camming surface on its right-hand end, in cooperation with the corresponding camming surface on the plunger 114, to shift said plunger downwardly to rock the lever 112 counter-clockwise, as viewed in Fig. 3. Counter-clockwise movement of the lever 112 rocks the lever 110 in a contrary direction, which, through the spring 109, rocks the lever 108 to shift the clutch driven member 104 upwardly to engage the teeth on its upper edge with the teeth in the clutch driving member 107. Simultaneously with the engaging of the clutch teeth, the lever 108 also operates a mercury switch 117 (Fig. 3) to complete the electrical circuit to the operating motor to initiate operation of said motor for carriage return purposes. Operation of the motor drives the shaft 105, the clutch driving member 107, and the clutch driven member 104, causing said driven member, in cooperation with the rack 103, to move the traveling carriage 82 in return direction.

When the traveling carriage 82 reaches starting position, a permanent stop located thereon, in cooperation with a corresponding stop bar, terminates further movement of said carriage in a return direction. The manner in which the carriage return rack 103 is mounted on the carriage 82 permits said rack to be shifted toward the right and downwardly in relation to said traveling carriage by the clutch driven member 104, after the return movement of said carriage has been terminated. Downward movement of the rack 103, in cooperation with a flange 118 formed on the lower edge of the clutch driven member 104, shifts said driven member downwardly to disengage the teeth in its upper edge from the corresponding teeth in the clutch driving member 107, to restore said clutch driven member and the control switch 117 to ineffective positions, as shown in Fig. 3.

The slide 115 (Fig. 3) is provided with a protruding finger piece 119 (Fig. 3) for the purpose of manually operating said slide to return the traveling carriage from any tabulated position to starting position. The present machine is also equipped with mechanism for causing the traveling carriage to be selectively returned from tabulated positions to predetermined columnar positions. However, as this mechanism has no particular bearing upon the present invention, it is not disclosed herein. If desirable, a full disclosure of this selective return mechanism may be had by reference to the Christian Patent No. 2,082,098.

Traveling carriage tabulating mechanism

The present machine is provided with tabulating mechanism for controlling the columnar positioning of the traveling carriage to bring different columnar portions of the record material into register with the printing mechanism for the recording of data relative to various transactions. This tabulating mechanism is often referred to as the "accounting machine tabulating mechanism" to distinguish it from the typewriter tabulating and/or letter-spacing mechanism, as these two mechanisms function independently of each other.

Ordinarily the tabulating mechanism functions automatically near the end of each machine operation to tabulate the carriage from one columnar position to the next. In additon, the carriage may be skip-tabulated to predetermined columnar positions by use of the Skip-Tabulating release bar 34 (Fig. 1) to initiate machine operation. Moreover, the carriage may be tabulated from one columnar position to another whenever desired by the manipulation of a Tabulating key conveniently located on the accounting machine keyboard.

Removably mounted on the front of the traveling carriage framework 82 (Figs. 3 and 4) is a tabulating bar 120, which supports adjustable control blocks 121 arranged in positions on said bar corresponding to the various columnar positions of the traveling carriage 82 and the record material supported by the platen 81. The control blocks 121 may be adjusted laterally in any position desired upon the bar 120, and said bar 120 may be readily removed from the traveling carriage 82 in case it is desired to substitute another bar having the various control blocks properly arranged thereon for a different accounting system.

The control blocks 121 (Fig. 4) have thereon a tabulating stop projection 122, which cooperates with the upper end of a carriage stop bar 123 and an escapement control bar 124, the upper ends of which bars fit freely in a slot formed in an enlarged portion of a tabulating frame 125 extending between and secured to the frames 29 and 30. The stop bar 123 (Figs. 4 and 5) has in its lower end a slot which is engaged by a stud 126 in a lever 127 pivoted on a screw stud 128 threaded in the tabulating frame 125. An enlarged downward surface on the lever 127 overlies a stud 129 in the lower end of an escapement disabling bar 130 mounted to shift vertically in a slot formed in an enlarged portion 131 of the frame 125. A plate 132 (Fig. 6), secured to the enlarged portion 131, retains the bar 130 in the slot formed in said enlarged portion. A spring 133, tensioned between the lever 127 and a bent-over portion of the plate 132, urges said lever counter-clockwise, as viewed here, to normally maintain an enlarged portion on its upper edge in contact with a lower stop surface formed on the portion 131.

Figure 11:
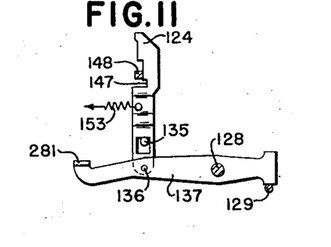
Fig. 11 is a detail view of a portion of the traveling carriage tabulating mechanism.

The stop bar 123 (Figs. 4, 5, and 11) carries a stud 135, which extends through a slot in the lower end of the escapement control bar 124 to form an operating connection between these two bars. The lower end of the escapement control bar 124 is pivotally connected by a stud 136 to one end of a lever 137 free on the stud 128, said lever having an enlarged lower portion which overlies the stud 129 in exactly the same manner as explained in connection with the lever 127. An enlarged upper portion of the lever 137 is arranged to cooperate with the stop surface on the portion 131 of the frame 125 in exactly the same manner as explained in connection with the lever 127.

The left-hand end of the lever 127 (Figs. 4 and 5) overlies the right-hand end of a lever 138 free on a screw stud 139 threaded in the frame 125.

The left-hand end of the lever 138 engages a slot in an operating arm 140, which is actuated automatically and/or manually in various ways to rock the lever 138 counter-clockwise when it is desired to tabulate the traveling carriage 82. Counter-clockwise movement of the lever 138 rocks the lever 127 clockwise, against the action of the spring 133, permitting the stud 126, in cooperation with the slot in the lower end of the tabulating stop bar 123, to release said bar to the action of a torsion spring 141, which underlies the stud 135. The spring 141 carries the stop bar 123 upwardly in unison with clockwise movement of the lever 127, and, during clockwise movement of said lever, a square stud 142 (Fig. 5), carried thereby, moves beyond the tooth of a latch 143 free on a stud 144 in the frame 125, whereupon a spring 145 rocks said latch clockwise to move the tooth thereon into the path of said stud 142 to obstruct return counter-clockwise movement of said lever 127 and return downward movement of said stop bar 123. Clockwise movement of the latch 143, under action of the spring 145, causes a hump 146 thereon, in cooperation with the right-hand edge of the stop bar 123, to shift said bar slightly toward the left, as viewed here.

Upward movement of the bar 123, through the stud 135 (Figs. 4, 5, and 11), in cooperation with the slot in the lower end of the bar 124, carries said bar 124 upwardly in unison therewith, rocking the lever 137 clockwise in unison with the lever 127. When the bar 124 reaches the extent of its upward movement, a notch 147 in its edge moves into alinement with a square stud 148 in an arm 149 pivoted on a screw stud 150 threaded in the frame 125. A spring 151 (Fig. 4) urges the arm 149 clockwise to normally maintain a shoulder thereon in contact with a stop stud 152 in the frame 125. When the notch 147 moves into alinement with the stud 148, a spring 153 (Figs. 4 and 11) urges the bar 124 toward the left, or counter-clockwise, to engage said notch 147 with said stud 148 to yieldingly retain said bar 124 in its upward position.

Upward movement of the bar 123 and consequent clockwise movement of the lever 127 (Figs. 4, 5, and 6), through the stud 129, shift the bar 130 downwardly against the action of a spring 154 tensioned between the plate 132 and a finger of a bell crank 155 free on a stud in a bent-over extension of said plate 132, said finger of said bell crank engaging a slot in the lower end of said bar 130. Downward movement of the bar 130 rocks the bell crank 155 (Fig. 6) counter-clockwise against the action of the spring 154, which movement, through a link 156 pivotally connecting an arm of said bell crank 155 to a lever 157 free on a stud in the escapement frame 95, rocks said lever 157 clockwise against the action of a spring 158. Clockwise movement of the lever 157, through a link 159 pivotally connecting a rearward extension of said lever to a rearward extension of a yoke 160 free on a shaft 161 supported by the frame 95, rocks said yoke 160 also clockwise. Clockwise movement of the yoke 160 causes an upwardly extending arm 162 thereof to engage the escapement retaining pawl 97 (Figs. 6 and 8) and rock said pawl out of engagement with the teeth of the escapement ratchet 96 to free said ratchet and the traveling carriage 82 for movement in a tabulating direction under influence of the spring-actuated draw band 90, which immediately starts said carriage moving in a tabulating direction. The traveling carriage 82 continues to move in a tabulating direction, or toward the right, as viewed in Fig. 4, until the stop lug 122 on the control block 121 located in the next columnar position strikes the upper end of the bar 123 and carries said bar toward the right in unison therewith, until the right-hand edge of the bar 123 contacts the right-hand wall of the slot in the tabulating frame 125, to terminate tabulating movement of said traveling carriage 82. Clockwise or right-hand movement of the stop bar 123, in cooperation with the hump 146 (Figs. 4 and 5) on the latch 143, rocks said latch counter-clockwise against the action of the spring 145 to disengage said latch from the stud 142 to release the lever 127 and the stop bar 123 to the action of the spring 133, which immediately rocks said parts counter-clockwise and downwardly, respectively. This moves the upper end of the stop bar 123 out of the path of the lug 122 and beneath the upper end of the escapement control bar 124, which does not protrude as far to the left (Fig. 4) as the bar 123 and consequently up to this time has not been engaged by the lug 122 and therefore is still in its upward position in the path of said lug.

After the lug 122 has carried the stop bar 123 into contact with the wall of the slot in the frame 125, the traveling carriage 82 rebounds slightly from said stop. This momentarily frees the bar 123, and it is during this period that the spring 133 (Figs. 4 and 5) returns said bar downwardly out of the path of the lug 122. When the traveling carriage 82 returns from the rebounding movement referred to above, the lug 122 contacts the upper end of the escapement control bar 124 (Figs. 4, 6, and 11) and rocks said bar toward the right, as viewed here, against the action of the spring 153, to disengage the notch 147 from the stud 148, whereupon the spring 154 is free to rock the bell crank 155 clockwise to restore the bar 130 upwardly, which, through the stud 129, rocks the lever 137 (Fig. 11) counter-clockwise to move the bar 124 downwardly out of the path of the lug 122. Clockwise return movement of the bell crank 155 (Figs. 6 and 8), through the link 156, the lever 157, and the link 159, returns the yoke 160 and the upwardly extending arm 162 thereof counter-clockwise to reengage the escapement retaining pawl 97 with the teeth of the ratchet 96 to locate and retain the traveling carriage 82 in its tabulated columnar position.

By reference to Fig. 4, it will be noted that the right-hand upper ends of the bars 123 and 124 have thereon similar angular surfaces, which permit the stop lugs 122 to by-pass said bars in case the traveling carriage is inadvertently moved in a return direction while said bars are in their upward positions. The elongated slot in the lower end of the bar 123 (Figs. 4 and 5), in cooperation with the stud 126, and the spring-actuated arm 149 in cooperation with the bar 124, permit said bars to be depressed when the lugs 122 by-pass their upper ends, in case the traveling carriage is moved in a return direction when said bars are in their upward positions, thereby preventing damage to the tabulating mechanism.

Carriage control of machine releasing

The machine releasing mechanism, shown in Fig. 1 and explained earlier herein, is normally locked against operation when the traveling carriage is out of columnar positions. However, when said carriage is in columnar positions, this locking mechanism is rendered ineffective.

Each of the control blocks 121 (Fig. 1) has a tappet 164, which, in cooperation with an upturned extension 165 of a control lever 166 free on a stud 167 in a tabulating frame 125 (Fig. 4), depresses said lever 166, when the traveling carriage 82 is in any of its columnar positions. Depression of the lever 166, through a wire link 168 connecting said lever to a crank 169 secured on a shaft 170 journaled in the main frames 29 and 30, rocks said crank and said shaft counterclockwise, as viewed in Fig. 1. Also secured on the shaft 170 and moving counter-clockwise in unison therewith is an arm 171, a finger of which, in cooperation with a stud 172 in a control lever 173 free on a stud 174 in the right frame 29, rocks said lever clockwise against the action of a spring 175. Clockwise movement of the lever 173 withdraws an obstructing shoulder, formed in a recessed portion thereof, from a square stud 176 in the lever 48 and moves a clearance portion of said recess opposite said stud, to free said lever 48 for counter-clockwise releasing movement, upon depression of any one of the starting bars 33, 34, and 35, as explained earlier herein.

When the traveling carriage 82 moves out of columnar position, the corresponding tappet 164 (Fig. 1) is withdrawn from the upward extension 165 of the lever 166, thereby releasing said lever and the control lever 173 to the action of the spring 175, which immediately restores said lever 173 counter-clockwise to engage the shoulder thereon with the stud 176 to obstruct releasing movement counter-clockwise of the lever 48.

It is therefore evident that the mechanism shown in Fig. 1, and explained above, locks the machine against operation when the traveling carriage is out of columnar position.

Carriage control of totalizer functions

Any of the six totalizers with which the machine is equipped may be selected for addition by means of corresponding hanging bar levers 177 (Fig. 1) supported by the stud 167, in cooperation with corresponding tappets 178 on the control blocks 121. Likewise, the balance totalizer may be selected for subtraction by means of a subtract hanging bar lever, not shown, but similar to the lever 177, in cooperation with a corresponding subtract tappet on any one or more of the control blocks 121. Furthermore, all of the six totalizers may be non-added by means of a non-add hanging bar lever (not shown) in cooperation with corresponding non-add tappets on any one or more of the control blocks 121.

The mechanism under control of the traveling carriage 82 in its columnar positions, for selecting the various totalizers for addition, for selecting the balance totalizers for subtraction, and for non-adding all of the totalizers, is fully disclosed in one or more of the patents referred to hereinbefore.

Skip-tabulating mechanism

In skip-tabulating operations, depression of the Skip-Tabulating release bar 34 (Fig. 1), through a link 179 (Fig. 4), rocks a latch 280 over a bent-over portion 281 (see also Fig. 11) of the lever 137 to restrain said lever against clockwise movement under influence of the levers 138 and 127 (Figs. 4 and 5) upon their movement to release the carriage for tabulating movement. This retains the escapement control bar 124 in its downward position, whereupon said bar, by means of the slot therein, in cooperation with the stud 135, likewise retains the tabulating stop bar 123 in its downward position. This holds the bars 123 and 124 out of the path of the stop lugs 122 on the control blocks 121 so as not to interfere with tabulating movement of the traveling carriage through intervening columnar positions. When the traveling carriage 82 arrives at a predetermined columnar position after having skipped the intervening columns, mechanism controlled thereby and fully disclosed in the Christian Patent No. 2,082,098 rocks the latch 280 (Fig. 4) out of engagement with the bent-over portion 281 of the lever 137 to release said lever and the bars 123 and 124 to the action of the spring 141 (Figs. 4 and 5), which immediately moves said bars upwardly into the path of the lug 122 on the control block 121 corresponding to the predetermined columnar position. Thereafter the tabulating mechanism functions in a normal manner as explained earlier. When the bar 123 (Figs. 4, 5, and 6) is held in its downward position, as explained above, the slot in its lower end provides sufficient clearance for the stud 126, so as not to interfere with the usual and necessary movement counter-clockwise and clockwise, respectively, of the levers 138 and 127. Clockwise movement of the lever 127 depresses the bar 139 to disengage the escapement retaining pawl 97, in the manner explained earlier herein, to free the traveling carriage 82 for tabulating movement.

Balance and sub-balance keys

Figure 10:
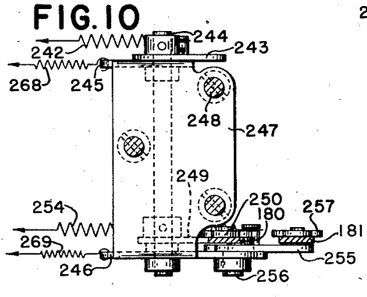
Fig. 10 is a plan view of a portion of the key operating means shown in Fig. 9.

The balance totalizer is selected and conditioned for balance or total operations by means of a Balance key 180 (Figs. 9, 10, and 12), and said totalizer is selected and conditioned for sub-balance or sub-total operations by means of a Sub-Balance key 181, the upper ends of the stems of said keys being undercut to engage corresponding slots in a key plate 182 secured to the left frame 30, and the lower ends of the stems of said keys being similarly undercut to engage corresponding notches in a horizontal portion of an angle bar 183, also secured to the left frame 30. Each of the keys 180 and 181 has a compressible spring 184 coiled around its reduced lower end. These springs are tensioned to urge said keys upwardly to undepressed positions, as shown here, which positions are determined by shoulders formed on the stems of said keys by their undercut upper portions, in cooperation with the lower surface of the plate 182.

The Balance key 180 is a so-called "motorized key," in that its depression initiates machine operations, the same as depression of any one of the release or starting bars 33, 34, or 35 (Fig. 1), as explained earlier herein. In sub-balance operations, it is necessary to depress both the Sub-Balance key 181 and the Balance key 180, and this is effected by a finger 185 (Fig. 9), secured to the stem of the Sub-Balance key 181, in cooperation with the underlying stud 186 secured in the stem of the key 180, through the medium of which depression of the Sub-Balance key 181 also simultaneously depresses the Balance key 180, to properly initiate a sub-balance operation in the balance totalizer.

The Balance key 180 (Figs. 9 and 12) has a notch 187 engageable by a bent-over ear 188 on a trip lever 189 free on a stud 190 secured in the left frame 30. A spring 191 urges the lever 189 clockwise to normally maintain the ear 188 in yielding contact with the forward end of a non-repeat pawl 192 free on a stud 193 in the frame 30. A spring 194 urges the pawl 192 clockwise to normally retain the forward end of said pawl in the path of the ear 188 on the lever 189. The pawl 192 has a notch 195 engaged by a bent-over ear 196 on a pawl-operating arm 197 pivoted on a stud 198 in a bracket 199 secured to the Balance key 180. A spring 200 (Fig. 12), tensioned between the arm 197 and the bracket 199, urges said arm clockwise to normally maintain the ear 196 in engagement with the notch 195, as shown here.

Depression of the Balance key 180 (Figs. 9 and 12) causes the ear 196 to engage the downward wall of the notch 195 and rock the pawl 192 counter-clockwise, against the action of the spring 194, to move the upper end of said pawl beneath and out of the path of the ear 188 on the lever 189 to free said lever to the action of the spring 191. Downward movement of the Balance key 180 likewise moves the notch 187 therein opposite the ear 188; consequently the spring 191 immediately rocks the lever 189 clockwise to engage said ear with said notch 187. Upon clockwise movement of the trip lever 189, the ear 188 engages the forward surface of the arm 197 and rocks said arm counter-clockwise, against the action of the spring 200, to move the ear 196 thereon out of engagement with the notch 195 and into a clearance recess formed in said pawl 192. Clockwise movement of the trip lever 189 causes a stud 201, in a downward extension thereof, to engage an arm 202 secured on the left-hand end of a trip shaft 203, journaled in the main frames 29 and 30, and rock said arm and said shaft counter-clockwise as viewed in Fig. 12 and clockwise as viewed in Fig. 1. Clockwise movement of the shaft 203 and an arm 204 secured on its right-hand-end (Fig. 1) causes said arm, which is bifurcated at its upper end to embrace a stud 205 in a downward extension of the lever 48, to rock said lever counter-clockwise against the action of the spring 49 to initiate machine operation in the manner explained near the beginning of this specification.

The pawl 192 (Fig. 12) and the arm 197 form a non-repeat device which permits the shaft 203 to be restored to untripped position at the end of machine operation in case the Balance key 180 is inadvertently retained depressed.

When clockwise tripping movement of the trip lever 189 (Fig. 12) rocks the arm 197 counter-clockwise to disengage the ear 196 from the notch 195, as explained above, the spring 194 returns the pawl 192 clockwise until the upper edge of said pawl contacts the bottom surface of the ear 188. Therefore, the pawl 192 is free to move upwardly or clockwise under influence of the spring 194 into the path of the ear 188 when the lever 189 is restored counter-clockwise, as will now be explained.

Figure 12:
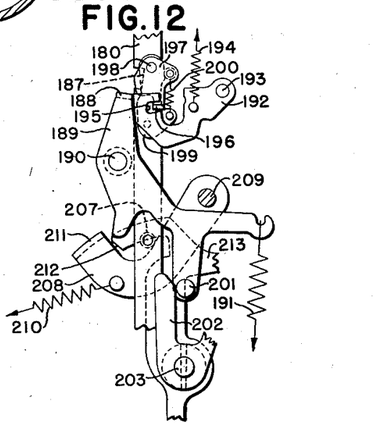
Fig. 12 is a detail view of the balance key and certain controlling mechanisms associated therewith.

Near the end of machine operation, the lever 48 (Fig. 1) is restored clockwise, in the manner explained previously, and, through the stud 205, restores the arm 204 and the shaft 203 counter-clockwise as shown in Fig. 1 and clockwise as shown in Fig. 12, which movement of said shaft, through the arm 202 and the stud 201, restores the trip lever 189 counter-clockwise, against the action of the spring 191, to disengage the ear 188 from the notch 187 in the Balance key 180, to free said key for restoration upwardly by the spring 184 (Fig. 9). Inasmuch as the ear 196 (Fig. 12) of the arm 197 has previously been disengaged from the notch 195 in the pawl 192, said pawl is free to move clockwise under influence of the spring 194, into the path of the ear 188, to obstruct releasing movement clockwise of said trip lever 189 in case the Balance key 180 is inadvertently or otherwise retained depressed at the end of machine operation. Thus it is clear that the above-described mechanism prevents repeat operations of the machine when the Balance key 180 is retained depressed at the end of machine operation, either alone or in conjunction with the Sub-Balance key 181, through the finger 185 and the stud 186.

Restoring upward movement of the Balance key 180 by its spring 184 (Figs. 9 and 12) carries the arm 197 upwardly in unison therewith, and, when the ear 196 on said arm moves into register with the notch 195, the spring 200 rocks said arm 197 clockwise to engage said ear with said notch, as shown in Fig. 12, in preparation for a succeeding balance or sub-balance operation.

Mechanism controlled by the Balance key 180 (Fig. 12) is provided for obstructing releasing movement of the shaft 203 when said Balance key is partially depressed, said mechanism operating alternatively to obstruct depression of said Balance key 180 upon releasing counter-clockwise movement of the shaft 203.

The stem of the Balance key 180 (Fig. 12) has secured therein a stud 207, which cooperates with the upper edge of an arm 208 free on a stud 209 in the left frame 30, said arm 208 being urged clockwise by a spring 210 into yielding engagement with said stud 207. The arm 208 has a bent-over portion 211, which cooperates with the forward end of a finger 212 on an arm 213 secured on the release shaft 203.

When the Balance key 180 is in its upward position—that is, not depressed, as shown in Fig. 12—releasing counter-clockwise movement of the shaft 203 and the arm 213 causes the finger 212 to pass beneath the bent-over portion 211 of the arm 208, to obstruct counter-clockwise movement (Fig. 12) of said arm. This, through the stud 207, locks the Balance key 180 in its upward position against depression and, through the stud 186 and the finger 185 (Fig. 9), likewise locks the Sub-Balance key 181 in its upward or undepressed position. When either the Balance key 180 or the Sub-Balance key 181 is partially depressed, downward movement of said Balance key 180, through the stud 207, rocks the arm 208 slightly counter-clockwise to move the rearward edge of the bent-over portion 211 into the path of the finger 212 to obstruct releasing movement counter-clockwise, as viewed in Fig. 12, and releasing movement clockwise, as viewed in Fig. 1, of the release shaft 203, to prevent operation of the machine when either of said Balance or Sub-Balance keys is partially depressed. Full depression of either the Balance key 180 or the Sub-Balance key 181, through the stud 207, rocks the arm 208 counter-clockwise sufficiently against the action of the spring 210 to move the bent-over portion 211 beneath the finger 212, so as not to interfere with releasing counter-clockwise movement of the shaft 203 (Fig. 12), which movement causes said finger 212 to pass over the bent-over portion 211 to secure said arm 208 in its counter-clockwise position during operation of the machine.

*Automatic balance and sub-balance mechanism*

The present machine is provided with mechanism for depressing the Balance key 180 (Fig. 9) to initiate an automatic balance operation, and for depressing both the Balance key 180 and the Sub-Balance key 181 to initiate an automatic sub-balance operation. The above automatic balance and sub-balance mechanism is rendered effective by the traveling carriage tabulating mechanism, shown in Fig. 4 and explained earlier herein, and is actuated by the traveling carriage upon its arrival in predetermined columnar positions, or, to state it another way, the automatic balance and sub-balance mechanism functions only when the carriage is moved in a tabulating direction to predetermined columnar positions.

Directing attention to Figs. 3 and 4, adjustably mounted in predetermined columnar positions on the bar 120 are a sub-balance control block 214 and a balance control block 215, having pivotally mounted thereon, respectively, a sub-balance control tappet 216 and a balance control tappet 217, both of which cooperate with a horizontal extension 218 (see also Fig. 7) of an arm 219 free on a screw stud 220 threaded in the tabulating frame 125, said arm 219 having in its right-hand end a slot, concentric with the stud 220, which engages a guide stud 221 in the frame 125.

When the traveling carriage 82 is moving in a tabulating direction—that is, toward the right, as viewed in Fig. 4—the control tappets 216 and 217 are firm and in this case engage the extension 218 and depress the arm 219 to actuate the automatic sub-balance and balance mechanisms, as will be explained presently. When the traveling carriage is moving in a return direction, or toward the left, as viewed in Fig. 4, the control tappets 216 and 217 are flexible and in this case by-pass the extension 218 of the arm 219 without depressing said arm. Therefore, said tappets 216 and 217 are effective only when the traveling carriage 82 is moving in a tabulating direction.

Cooperating with the arm 219 (Figs. 4 and 7) is a companion arm 222 also pivotally supported by the stud 220 and having in its right-hand end a guide slot which engages the guide stud 221 exactly the same as the arm 219. Pivotally connected to a right-hand extension of the arm 222 (Figs. 4 and 7) is a switch operating bar 223 supported for vertical sliding movement in a slot formed in the left frame 30, the lower end of said bar 223 having secured thereto a switch operating block 224 made of suitable insulating material. The extreme lower ends of the bar 223 and the block 224 extend through a suitable opening in the base plate 31, and said block normally rests on an upper spring blade 225, which, together with a central spring blade 226, forms a balance switch for energizing a solenoid which depresses the Balance key, as will be explained presently. Likewise the central blade 226, together with a lower spring blade 227, forms a control switch for energizing a solenoid which depresses the Sub-Balance key, as will also be explained presently. The left-hand ends of the blades 225, 226, and 227 are secured in fixed relationship to each other by insulating blocks 228 in turn secured to a solenoid support plate 238 secured to the bottom surface of the machine base 31 by a plurality of screws.

Figure 2:
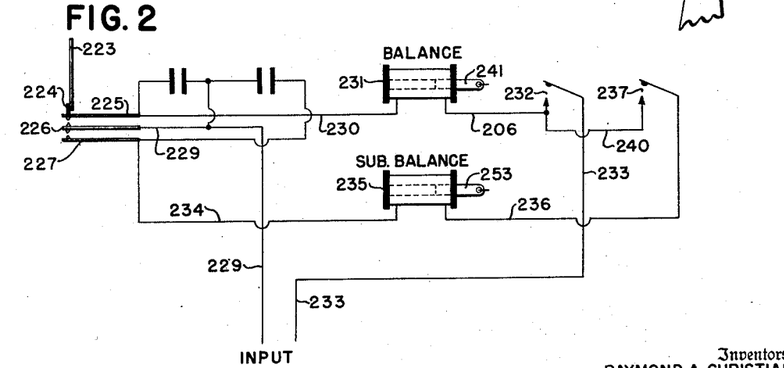
Fig. 2 is a wiring diagram of the electromagnetic means and the switch mechanisms associated therewith for automatically controlling balance and/or sub-balance operations in the balance totalizers.

In Fig. 2 is illustrated a wiring diagram for the switch mechanisms and the corresponding solenoids, from which it may be seen that the central switch blade 226 is connected by a lead wire 229 directly to a source of electrical energy or input source. The upper blade 225 is connected by a lead wire 230 to one terminal of a balance solenoid 231, the other terminal of which is connected by a lead wire 206 to a manually operable switch 232, in turn connected by a lead wire 233 to the other side of the source of electrical energy or input. The lower blade 227 is connected by a lead wire 234 to one terminal of a sub-balance solenoid 235, the other terminal of which is connected by a lead wire 236 to a manually operable switch 237 in turn connected by a lead wire 240 to the switch 232.

It is obvious from observing the wiring diagram (Fig. 2) that the switch 237 is not effective unless the switch 232 is closed, and that said switch 232, when closed, renders the balance solenoid effective, and that the switch 237, when closed, renders the sub-balance solenoid 235 effective. Therefore, when the switch 232 alone is closed, the balance solenoid 231 only is effective, and when said switch 232 and the switch 237 are both closed, both the balance solenoid 231 and the sub-balance solenoid 235 are effective.

By referring to Fig. 2, it will be seen that a system of condensers is connected between the upper and lower switch blades 225 and 227 and the central switch blade 226, to improve the efficiency of the switch mechanism by preventing excessive sparking between the contact points thereof, thus eliminating the excessive radiation of undesirable interferences and noises.

The balance and sub-balance solenoids 231 and 235 are secured to the bottom surface of the plate 238 (Fig. 9), and said solenoids and the switch mechanism 228 are enclosed by a suitable cover 239, secured to angular brackets 251 carried by said plate 238.

The balance solenoid 231 (Figs. 2, 9, and 10) shiftably supports, in its hollow core, an armature 241 connected by a closely coiled spring 242 to an arm 243, said spring, in this case, serving as a link. The arm 243 is secured on one end of a shaft 244 journaled in parallel side members 245 and 246 of a bracket 247 secured by screws 248 to the machine base 31. Also secured on the shaft 244 is a crank 249 pivotally connected by a link 250 to the Balance key 180. A stud 252 (Fig. 9) in the member 245 of the bracket 247, in cooperation with a slot in the arm 243, limits the rocking movement of said arm, the shaft 244, and the crank 249.

The sub-balance solenoid 235 shiftably supports in its hollow core an armature 253 connected by a closely coiled spring 254, similar to the spring 242, to a corresponding arm 255, said arm carrying a stud 256 journaled in a hub secured in the side member 246 of the bracket 247. The arm 255 is connected by a link 257 to the Sub-Balance key 181. A stud 258 in the side member 246 of the bracket 247 cooperates with a slot in the arm 255 to limit its rocking movement.

The upward extension 218 of the arm 219 (Figs. 4 and 7) is normally beneath or out of the path of the control tappets 216 and 217, except when the traveling carriage is moving in a tabulating direction. This is controlled by opposed camming surfaces formed in two similar slots 260 and 261 in the arms 219 and 222, respectively, in cooperation with a flattened stud 262, which extends through said slots and is secured in one end of a bar 263, the other end of which is pivoted on a stud 264 (Fig. 4) in an upward extension of a lever 265 free on a screw stud 266 threaded in the tabulating frame 125. A hook-shaped extension of the lever 265 has a slot which engages a stud 267 (Figs. 4 and 5) in the right-hand end of the lever 127.

By referring to Figs. 4 and 5, it will be recalled that the traveling carriage 82 is released for tabulating movement by downward movement imparted to the operating arm 140, which movement rocks the lever 138 counter-clockwise and the lever 127 clockwise, as viewed here. Clockwise movement of the lever 127, through the stud 267, rocks the lever 265 counter-clockwise to shift the bar 263 and the stud 262 toward the left. The stud 262, coacting with the camming surfaces in the slots 260 and 261, shifts the arms 219 and 222 in opposite directions to extend or lengthen the operating connection between the tappets 216 and 217 and the switch mechanism formed by the extension 218 and the bar 223. This moves the extension 218 of the arm 219 upwardly into the path of the tappets 216 and 217, to effectuate the automatic balance and sub-balance mechanism.

When the traveling carriage 82 (Figs. 3 and 4) nears the sub-balance columnar position, while moving in a tabulating direction or toward the right as viewed in Fig. 4, and just prior to the time that the stop lug 122 on the control block 121 for the sub-balance column strikes the stop bar 123, the sub-balance tappet 216 engages the extension 218 and depresses the arm 219, which, through the stud 262 (Figs. 4 and 7), in cooperation with the narrow portions of the slots 260 and 261, simultaneously depresses the arm 222 to shift the bar 223 downwardly full distance. Full downward movement of the bar 223, through the block 224, engages the contact point of the blade 225 with the corresponding contact point on the upper surface of the central blade 226 and carries said central blade downwardly in unison therewith a sufficient distance to engage the contact point on the lower surface of said blade 226 with the corresponding contact point on the lower blade 227 (Figs. 2 and 4) to energize both the balance solenoid 231 and the sub-balance solenoid 235. Energizing of the solenoids 231 and 235 (Figs. 2 and 9) causes the corresponding armatures 241 and 253 to be displaced rearwardly or toward the left, as viewed here, which movement, through the corresponding springs 242 and 254 (Figs. 9 and 10), rocks the corresponding arms 243 and 255 clockwise. Clockwise movement of the arm 243, the shaft 244, and the crank 249, and such movement of the arm 255 (Fig. 9), through the corresponding links 250 and 257, simultaneously depress the Balance key 180 and the Sub-Balance key 181 to initiate an automatic sub-balance operation.

At approximately the same time as the solenoids 231 and 235 function, the tappet 164 (Fig. 1) on the control block 121 for the sub-balance column engages the extension 165 to rock the lever 173 clockwise to free the lever 48 for counter-clockwise releasing movement under influence of the depressed Balance and Sub-Balance keys. Soon after the solenoids 231 and 235 have been energized and at approximately the same time as the latch lever 173 is moved to ineffective position, the stop lug 122 (Figs. 4 and 5) contacts the stop bar 123 to disengage the latch 143 from the square stud 142 to release the lever 127 to the action of the spring 133, which immediately restores said lever counter-clockwise in the manner explained earlier herein in connection with the traveling carriage mechanism. Restoring counter-clockwise movement of the lever 127, through the stud 267, rocks the lever 265 clockwise to shift the bar 263 and the stud 262 toward the right, as viewed in Fig. 4, to cause said stud 262 (Figs. 4 and 7), in cooperation with the camming surfaces in the slots 260 and 261 in the arms 219 and 222, to lower the extension 218 out of the path of the tappets 216 and 217 to release the switch mechanism and thus render the automatic balance and sub-balance mechanism ineffective. As the carriage settles in the sub-balance columnar position, the lug 122 engages and releases the escapement control bar 124 (Figs. 4 and 11) to again render the escapement mechanism effective to hold said carriage in said columnar position.

When the traveling carriage is moving in a tabulating direction under influence of the typewriter escapement mechanism upon use of the typewriter portion of the machine to type various data of a descriptive nature or otherwise upon the record material, it is evident that, even though the balance and sub-balance tappets 217 and 216 pass over the extension 218, the automatic balance and sub-balance mechanism will not be actuated, as the extension 218 is, in this case, retained out of the path of said tappets 216 and 217. Generally during return movement of the traveling carriage toward the left, as viewed in Fig. 4, the extension 218 of the arm 219 is beneath the tappets 216 and 217. However, if for any reason said extension 218 is in its upward position in the path of said tappets, they will by-pass said extension without imparting any depressing movement thereto, due to the flexible connection of said tappets to the corresponding control blocks 214 and 215 (Fig. 4).

As a general rule, the balance column of the record material is the column next or adjacent to the sub-balance column of said record material, and, after the sub-balance has been automatically recorded in the sub-balance column, the traveling carriage is tabulated automatically from the sub-balance columnar position to the balance columnar position. Actuation of the tabulating mechanism causes the stud 262 (Figs. 4 and 7), in cooperation with the camming surfaces in the slots 260 and 261, to move the extension 218 into the path of the balance tappet 217, the same as in sub-balance operations.

When the traveling carriage 82 nears the balance columnar position, and just prior to the time that the lug 122 on the corresponding control block 121 contacts the upper end of the stop bar 123, the balance tappet 217, which, it will be recalled, is shorter than the sub-balance tappet 216, engages the extension 218 to depress said extension and the arm 219, which movement, through the narrow portions of the slots 260 and 261, in cooperation with the stud 262, carries the arm 222 and the bar 223 downwardly in unison therewith. The tappet 217 (Figs. 4 and 7) moves the bar 223 downwardly a sufficient distance to cause the block 224 to depress the upper blade 225 just far enough to engage the contact thereon with the contact on the upper surface of the central blade 226, but not far enough to engage the contact on the lower surface of said central blade with the contact on the lower blade 227.

In this case, the closing of the contacts on the upper blade 225 and the central blade 226, through the circuit shown in Fig. 2, energizes the balance solenoid 231, causing it to carry its armature 241 rearwardly. Rearward movement of the armature 241 (Figs. 9 and 10), through the corresponding spring 242, rocks the arm 243, the shaft 244, and the crank 249 clockwise, causing said crank 249, through the link 250, to depress the Balance key 180 to automatically initiate a balance operation. Immediately after the balance solenoid 231 has functioned, the stop lug 122 (Fig. 4) on the balance control block 121 strikes the upper end of the stop bar 123, to restore the lever 127 (Fig. 5) counter-clockwise to move the extension 218 of the arm 219 out of the path of the balance and sub-balance tappets 217 and 216, in exactly the same manner as explained in connection with sub-balance operations.

A spring 268 (Figs. 9 and 10), tensioned between the armature 241 for the balance solenoid 231 and the side member 245 of the bracket 247, counterbalances the weight of said armature 241 to prevent excessive frictional drag between said armature and the corresponding opening in the core of said balance solenoid 231, and said spring 268 likewise counteracts the downward pull of the spring 242 on said armature 241. A spring 269, tensioned between the side member 246 of the bracket 247 and the armature 253 for the sub-balance solenoid 235, functions exactly like the spring 268 to relieve said armature 253 from excessive frictional engagement with the opening therefor in the core of the sub-balance solenoid 235, and to counteract the downward pull of the spring 254.

When an overdraft occurs in the balance totalizer, the overall shaft 270 (Fig. 9) and a crank 271, secured on said shaft, are rocked counter-clockwise. The crank 271 is connected by a link 272 to a pitman 273, the rear end of which is supported by a slot therein in cooperation with a stud 274 in the frame 30. The forward end of the pitman 273 is pivotally connected to the upper end of an overdraft latch 275 free on a stud 276 in the frame 30. Counter-clockwise movement of the shaft 270 and the crank 271 shifts the link 272 and the pitman 273 rearwardly to rock the latch 275 also counter-clockwise. Counter-clockwise movement of the latch 275 (Fig. 9) engages a bent-over ear 277 on its lower end with a locking notch 278 in the stem of the Balance key 180 to lock said key against depression, either manually or by the balance solenoid 231, when the balance totalizer is in an overdrawn condition.

Counter-clockwise movement of the overdraft shaft 270, when an overdraft occurs in the balance totalizer, likewise actuates mechanism which unlocks the Overdraft or Credit Balance key and the Sub-Overdraft or Sub-Credit Balance key so that either a sub-credit balance operation or a credit balance operation may be initiated to effect the recording of the true negative balance upon the record material supported by the platen 81, as disclosed in the above-mentioned patent to Lehman, No. 2,243,806.

*Control of machine releasing mechanism*

The present machine is provided with mechanism which functions when the Main starting bar 33 (Fig. 1) is retained depressed at the end of machine operation, to cause the traveling carriage to be moved in a return direction to a predetermined columnar position. Likewise, the present machine is provided with mechanism which functions when the Skip Tabulating bar 34 is retained depressed at the end of machine operation, to cause the traveling carriage 82 to be skip-tabulated to a predetermined columnar position.

In case either the Main starting bar 33 or the Skip Tabulating bar 34 is retained depressed at the end of machine operation, it is necessary to disconnect the lever 48 (Fig. 1) from said Main bar 33, so that said lever, the arm 204, and the shaft 203 may be restored clockwise and counter-clockwise, respectively, as viewed in Fig. 1, and so that said shaft 203 and the arm 213 may be restored clockwise, as viewed in Fig. 12. Restoration of the arm 213 moves the finger 212 thereon from beneath the bent-over portion 211 of the arm 208 to free the Balance key 180 for depression by the solenoid 231 (Fig. 9) in case the succeeding operation is an automatic sub-balance or balance operation.

It will be recalled that the release arm 68 (Fig. 1) is restored a slight distance beyond home position in a clockwise direction near the end of machine operation, and this movement, through a stud 283 carried by said arm 68, in cooperation with a rearward extension of a lever 284 free on the shaft 203, rocks said lever counter-clockwise. Counter-clockwise movement of the lever 284, through a notch in an upward extension thereof, in cooperation with a stud 282 in the latch 42, shifts said latch forwardly or toward the left, as viewed in Fig. 1, against the action of the spring 49, to disengage the hook-shaped upward extension 46 thereof from the stud 47 in the lever 48 to free said lever for return movement clockwise under influence of the spring 49, in case either the Main release bar 33 or the Skip Tabulating bar 34 is retained depressed at the end of machine operation. Clockwise restoring movement of the lever 48, through the stud 205 and the arm 204, restores the shaft 203 and the arm 213 counter-clockwise, as shown in Fig. 1, and clockwise, as shown in Fig. 12, to move the finger 212 from beneath the bent-over portion 211 of the arm 208, to free the Balance key 180 for depression under the influence of the balance solenoid 231 (Figs. 2 and 9) in case the next operation is an automatic balance or sub-balance operation.

It is to be understood that it is the surplus or overthrow movement of the arm 68 in a restoring or clockwise direction which causes the stud 283, in cooperation with the lever 284, to move the latch 42 out of engagement with the stud 47, and that, as soon as said arm 68 is returned to untripped position, in which the shoulder 67 engages the stud 66, as shown in Fig. 1, the stud 283 is withdrawn from the rearward extension of the lever 284 to permit the spring 49 to restore the latch 42 to effective position, as shown here. The result of this is that, when pressure is released from the depressed bar 33 or 34, restoring upward movement of said bar, under influence of the springs 49 and 65, will cause the hook-shaped extension of said latch 42 to by-pass the stud 47, after which all parts assume the positions shown in Fig. 1, in preparation for a subsequent machine operation.

By referring to Fig. 1, it will be recalled that, in case the Main release bar 33 is retained depressed (and naturally this applies to the Skip Tabulating bar 34 and the Vertical Feed bar 35, which also depress the Main release bar to initiate machine operation), the same overthrow movement of the arm 68 in a clockwise or restoring direction which disengages the latch 42, through the stud 58, disengages the bent-over portion 55 of the slide 56 from the fingers 53 and 54 and moves said bent-over portion into a clearance opening formed by said flanges. This disconnects the arm 57 from the arm 51 and permits said arm 57 to be restored counter-clockwise by the spring-actuated bell crank 63, independently of said arm 51, to engage the stud 66, carried by said arm 57, with the shoulder 67 to retain the arm 68 and connected mechanism in home position and thus prevent a repeat releasing movement of said parts.

Ordinarily the tabulating arm 140 (Figs. 4 and 5) is actuated automatically near the end of machine operation to rock the levers 138 and 127 counter-clockwise and clockwise, respectively, to release the traveling carriage 82 (Fig. 3) for tabulating movement after the printing mechanism has functioned. Prior to the automatic actuation of the tabulating arm 140, the latch 42 (Fig. 1) is disengaged, and the lever 48 and the shaft 203 are returned to normal positions, in the manner explained above, to insure that the finger 212 (Fig. 12) of the arm 213 is moved from beneath the bent-over portion 211 of the arm 213 before the sub-balance and balance tappets 216 and 217 (Fig. 4) have had a chance to contact the upward extension 218, so as not to interfere with the automatic depression of the Sub-Balance and Balance keys 181 and 180, in case the next operation is an automatic sub-balance operation or an automatic balance operation.

*Summary of operation*

It is believed that a full understanding of the operation of the machine embodying the present invention will have been obtained by a careful perusal of the preceding specification. However, in summarizing briefly, it will be recalled that the control blocks 214 and 215 (Figs. 3 and 4), carrying the sub-balance and balance tappets 216 and 217, may be arranged or located upon the stop bar 120 in accordance with predetermined columnar positions of the record material supported by the platen roll 81. When the traveling carriage 82, while moving in a tabulating direction, arrives at a position corresponding to the sub-balance column on the record material, the sub-balance tappet 216, in cooperation with the extension 218, depresses the bar 223 full distance downwardly to close the contacts between the blades 225, 226, and 227, to energize both the balance solenoid 231 and the sub-balance solenoid 235 to cause the Balance key 180 and the Sub-Balance key 181 to be depressed to automatically initiate a sub-balance operation.

Likewise it will be recalled that, when the balance tappet 217 (Fig. 4) engages the extension 218 while the traveling carriage is moving in a tabulating direction, the bar 223 will be depressed a partial distance to engage the contacts between the blade 225 and the blade 226 to energize the balance solenoid 231 to cause the Balance key 180 to be depressed to initiate an automatic balance operation.

It will also be remembered that the mechanism including the stud 267, the bar 263, and the stud 262 (Figs. 4 and 7) functions when the traveling carriage 82 is released for tabulating movement by the operating arm 140, causing said stud 262, in cooperation with the slots 260 and 261 in the arms 219 and 222, to move the extension upwardly from an ineffective position into the path of the tappets 216 and 217. From this it is evident that the automatic balance and sub-balance mechanism is effective only upon release of the traveling carriage for tabulating movement by the accounting machine tabulating mechanism, and that said mechanism remains effective only while said carriage is moving in a tabulating direction under the influence of said accounting machine tabulating mechanism. Therefore the automatic balance and sub-balance mechanism does not in any way interfere with the use of the typewriter portion of the machine, as the letter-spacing movement of the traveling carriage (which is also in a tabulating direction) is not in any way influenced by or dependent upon the accounting machine tabulating mechanism.

While the form of mechanism shown and described herein is admirably adapted to fulfill the objects primarily stated, it is to be understood that it is not intended to confine the invention to the one form or embodiment disclosed herein, for it is susceptible of embodiment in various forms all coming within the scope of the claims which follow.

What is claimed is:

1. In a machine of the class described, having a balance totalizer capable of balance and/or sub-balance operations, and recording means positioned thereby to record balances and sub-balances, said machine also having a laterally shiftable traveling carriage for supporting record material, said carriage positionable in various columnar positions to present corresponding columnar portions of said record material to the recording means, the combination of means to initiate a balance operation; means used in conjunction with the balance initiating means to initiate a sub-balance operation; a separate solenoid to operate each of the initiating means; a selectively operable switch to connect the solenoids to a source of electrical energy; means to urge the carriage in a tabulating direction; means normally effective to restrain the carriage against tabulating movement; stops on the carriage located in relation to the various columnar positions thereof; means coacting with the stops to locate the carriage in its various columnar positions, said means normally out of coacting relationship with said stops; means to release the restraining means and to simultaneously move the locating means into coacting relationship with the stops to cause the carriage to tabulate from one columnar position to another; a member located on the carriage in relation to the balance columnar position thereof; a member located on the carriage in relation to the sub-balance columnar position thereof; an element coacting with the members; a part coacting with the switch; means forming a variable connection between the element and the part to move said element from a normally ineffective position into coacting relationship with the members and vice versa; and means operated by the releasing means, upon its movement to release the restraining means, to vary the connecting means to move the element into coacting relationship with the members, so that movement of the carriage to balance columnar position will cause the corresponding member to actuate the selectively operable switch in such a manner as to energize the balance solenoid, to initiate an automatic balance operation in which the balance is recorded in the balance column of the record material, or alternately, so that movement of the carriage to sub-balance columnar position will cause the corresponding member to actuate the selectively operable switch in such a manner as to energize both the solenoids to initiate an automatic sub-balance operation, in which the sub-balance is recorded in the sub-balance column of the record material.

2. In a machine of the character described, having a balance totalizer capable of balance and/or sub-balance operations, and recording means positioned by the totalizer for recording balances and/or sub-balances, said machine also having a traveling carriage for supporting record material, said record material divided into various columns, including balance and sub-balance columns, said carriage movable to various columnar positions corresponding to the columnar divisions of the record material for presenting said columnar divisions to the recording means, the combination of members on the carriage corresponding to the various columnar positions thereof; means coacting with the members to locate the carriage in its various columnar positions, said means normally out of coacting relationship with said members; means to constantly urge the carriage in a tabulating direction; means normally effective to restrain the carriage against movement in a tabulating direction; means to release the restraining means and to simultaneously move the locating means into coacting relationship with the members to cause the carriage to tabulate to its various columnar positions; means to initiate a balance operation; means operable in conjunction with the balance initiating means to initiate a sub-balance operation; a separate solenoid for each initiating means; operating connections between each solenoid and its corresponding initiating means; a selectively operable switch for connecting the solenoids to a source of electrical energy; a switch-operating element located on the carriage in relation to the sub-balance column; a switch-operating element located on the traveling carriage in relation to the balance column; extendable means intermediate the elements and the switch to form an operating connection therebetween, said extendable means normally retracted so as to be ineffective; and means operated by the releasing means upon its movement to release the restraining means to extend the extendable means to form an operating connection between the elements and the selectively operable switch, whereby movement of the carriage in a tabulating direction to sub-balance columnar position will cause the sub-balance element to operate the switch in such a manner as to energize both the solenoids to initiate a sub-balance operation, in which the sub-balance is recorded in the sub-balance column of the record material, and whereby movement of the carriage in a tabulating direction to balance columnar position will cause the balance element to operate the switch in such a manner as to energize the balance solenoid to initiate a balance operation, in which the balance is recorded in the balance column of the record material.

3. In a machine of the class described having a traveling carriage; tabulating means for the carriage; a balance totalizer; actuators capable of taking a balance and/or a sub-balance from said totalizer; a balance manipulative device operable to control the actuators for taking a balance from the totalizer; and a sub-balance manipulative device operable in conjunction with the balance manipulative device to modify the control of said actuators by the balance totalizers whereby the actuators are controlled to take a sub-balance from the totalizer, the combination of a first solenoid operatively connected to the balance manipulative device to operate the balance manipulative device when said first solenoid is energized; a second solenoid operatively connected to the sub-balance manipulative device to operate the sub-balance manipulative device when said second solenoid is energized; a switch for controlling said first solenoid; a switch for controlling said second solenoid; a common operating mechanism for closing both switches; a plurality of means on the carriage for differentially operating the common operating mechanism to move said mechanism one extent for balance operations to close said first switch and to move said mechanism a greater extent to close both switches for sub-balance operations; said common operating means being normally out of operating range of said plurality of means; and connections between the common operating means and the tabulating means for moving the common operating means into operating range of the said plurality of means when the tabulating mechanism is operated to tabulate the carriage.

4. In a machine of the class described having a traveling carriage; tabulating means for the carriage; a balance totalizer; actuators capable of taking a balance and/or a sub-balance from said totalizer; a balance manipulative device operable to control the actuators for taking a balance from the totalizer; and a sub-balance manipulative device operable in conjunction with the balance manipulative device to modify the control of said actuators by the balance totalizers whereby the actuators are controlled to take a sub-balance from the totalizer, the combination of a first solenoid operatively connected to the balance manipulative device to operate the balance manipulative device when said first solenoid is energized; a second solenoid operatively connected to the sub-balance manipulative device to operate the sub-balance manipulative device when said second solenoid is energized; a switch for controlling said first solenoid; a switch for controlling said second solenoid; a common operating mechanism comprising a pair of coupled but relatively adjustable members for closing both switches; a plurality of means on the carriage for differentially operating the common operating mechanism to move said mechanism one extent for balance operations to close said first switch and to move said mechanism a greater extent to close both switches for sub-balance operations, said common operating means being normally out of operating range of the plurality of means; and means controlled by the tabulating means when operated to tabulate the carriage to relatively adjust the pair of coupled adjustable members comprised in the common operating means, to position the common operating means into operating range of said operating mechanism.

5. In a machine of the class described having a traveling carriage; tabulating means for the carriage; a balance totalizer; actuators capable of taking a balance and/or a sub-balance from said totalizer; a balance manipulative device operable to control the actuators for taking a balance from the totalizer; and a sub-balance manipulative device operable in conjunction with the balance manipulative device to modify the control of said actuators by the balance totalizers whereby the actuators are controlled to take a sub-balance from the totalizer, the combination of a first solenoid operatively connected to the balance manipulative device to operate the balance manipulative device when said first solenoid is energized; a second solenoid operatively connected to the sub-balance manipulative device to operate the sub-balance manipulative device when said second solenoid is energized; a switch for controlling said first solenoid; a switch for controlling said second solenoid; a common operating mechanism for closing both switches; a plurality of means on the carriage for differentially operating the common operating mechanism to move said mechanism one extent for balance operations to close said first switch and to move said mechanism a greater extent to close both switches for sub-balance operations; means controlled by the tabulating means when operated to tabulate the carriage to control the effectiveness of said operating mechanism, said operating mechanism being normally out of operating range of the plurality of means on the carriage; and connections operable by the tabulating means when operated to tabulate the carriage to move the operating mechanism into operable range of the plurality of means on the carriage.

RAYMOND A. CHRISTIAN.
JESSE R. GANGER.
WILLIAM L. PADEN.

REFERENCES CITED

The following references are of record in the file of this patent:

UNITED STATES PATENTS

| Number | Name | Date |
|---|---|---|
| 910,749 | Vincent | Jan. 26, 1909 |
| 1,753,991 | Langford | Apr. 8, 1930 |
| 1,819,084 | Ens | Aug. 18, 1931 |
| 1,946,572 | Crosman | Feb. 13, 1934 |
| 2,222,373 | Rauh | Nov. 19, 1940 |
| 2,258,714 | Pitman | Oct. 14, 1941 |
| 2,308,216 | Sundstrand et al. | Jan. 12, 1943 |
| 2,364,758 | Roggenstein | Dec. 12, 1944 |
| 2,370,505 | Sundstrand | Feb. 27, 1945 |

Certificate of Correction

September 28, 1948.

Patent No. 2,450,121.

RAYMOND A. CHRISTIAN ET AL.

It is hereby certified that errors appear in the above numbered patent requiring correction as follows:

In the heading to the drawings, Sheets 1, 2, and 3, for "R. A. Christian" read *R. A. Christian et al.*; in the printed specification, column 22, line 21, for "overall" read *overdraft*; column 23, line 64, for "flanges" read *fingers*; and that the said Letters Patent should be read with these corrections therein that the same may conform to the record of the case in the Patent Office.

Signed and sealed this 7th day of December, A. D. 1948.

[SEAL]

THOMAS F. MURPHY,
*Assistant Commissioner of Patents.*